| United States Patent [19]
Pinson | [11] Patent Number: 4,889,400
[45] Date of Patent: Dec. 26, 1989 |

[54] THERMAL RESISTIVITY COATINGS FOR OPTICAL FIBERS

[75] Inventor: George T. Pinson, Huntsville, Ala.

[73] Assignee: The Boeing Company, Seattle, Wash.

[21] Appl. No.: 229,502

[22] Filed: Aug. 8, 1988

[51] Int. Cl.$^4$ .............................................. G02B 6/10
[52] U.S. Cl. ................................. 350/96.3; 350/96.33
[58] Field of Search ................ 350/96.23, 96.30, 96.33

[56] References Cited

U.S. PATENT DOCUMENTS

| 4,089,585 | 5/1978 | Slaughter et al. ................. 350/96.23 |
| 4,095,101 | 6/1978 | Lemelson . | |
| 4,304,462 | 12/1981 | Baba et al. ........................ 350/96.23 |
| 4,407,561 | 10/1983 | Wysocki ............................... 350/96.3 |
| 4,418,984 | 10/1983 | Wysocki et al. .................. 350/96.33 |
| 4,645,297 | 2/1987 | Yoshihara et al. ................. 350/96.23 |
| 4,653,851 | 3/1987 | Pedersen et al. .................. 350/96.23 |
| 4,673,247 | 6/1987 | Oestreich ............................ 350/96.23 |
| 4,740,055 | 4/1988 | Kanda et al. ...................... 350/96.30 |
| 4,750,806 | 6/1988 | Biswas ............................... 350/96.30 |
| 4,770,493 | 9/1988 | Ara et al. ........................... 350/96.30 |

Primary Examiner—James W. Davie
Attorney, Agent, or Firm—Finnegan, Henderson, Farabow, Garrett & Dunner

[57] ABSTRACT

Improved optical fiber constructions having an intumescent coating and one or mroe reflective coatings for protection against intermittent laser beams. Fire retardant latex ("FRL") is a preferred intumescent material, and aluminum, gold, silver, copper, rhodium and platinum are preferred reflective materials.

16 Claims, 2 Drawing Sheets

THERMAL RESISTIVITY COATINGS FOR OPTICAL FIBERS

BACKGROUND

1. Field of the Invention:

The present invention relates to thermal resistivity coatings for optical fibers, particular coatings resistive to light and heat energy incident from a laser.

2. Description of the Prior Art

Coatings for mechanical and fire protection of optical fibers are known per se. Representative of the prior art constructions include U.S. Pat. No. 4,089,585 (Slaughter et al.) which discloses coatings of plastic materials (e.g. nylon, polyurethane, polyvinyl acetal enamel) and also metallic coatings, such as aluminum and aluminum based alloys; U.S. Pat. No. 4,645,297 Yoshihara et al. (various fiber-reinforced resin compositions); and U.S. Pat. No. 4,653,851 (Pedersen et al.) (alternate layers of mica and synthetic materials such as Kelvor). Silicon acrolate also has been used as a coating for optical fibers.

However, optical fibers previously largely have been used in communication applications where the fibers are in an environmentally protected enclosure. Damage by lasers is not a subject of concern in such conventional applications; therefore, protection against laser damage has not been provided. Currently, optical fibers are used or proposed for use on weapon systems such as the Fiber Optic Guided Missile (FOG-M). One countermeasure for such systems will be to cut or damage the optical fiber by subjecting the fiber to a beam from a high energy laser. Optical fibers are not generally protected against thermal radiation and would therefore fail, causing the loss of the missile.

FIG. 1 depicts a possible laser-based countermeasure to an optical fiber guided missile. In FIG. 1, Fiber Guided Missile (FOG) 12 under control by communications with user 14 scans for target 16. High energy laser 18 mounted on vehicle 20 uses a scanning motion to cover the sector from which FOG 12 originates. Laser beam 22 damages optical fiber 24 as it passes over the fiber. Analysis shows that for a scan rate of 10 Hz at a range of 2 km from the fiber, a 4.5 MW laser would cut currently used optical fibers with plastic outer layers, where the outer layer is a covering of the silicon acrolate type. This laser power level is well within the state of the art. It is anticipated that methods to detect deployed optical fibers will be developed in the future and thereby permit a more accurate placement of the laser beam on the fiber. This will greatly reduce the laser energy required to damage the fiber, making optical fiber guided weapons even more vulnerable.

While there is no known technique identified to protect the fiber against laser damage where the laser beam is maintained on the fiber for an extended period of time, it is believed that protection can be provided for the condition where the laser beam is scanned to provide an umbrella of protection to targets. Scanning requires that a large area be covered by the laser beam with a resultant short dwell time on a particular fiber.

It is, therefore, an object of the present invention to provide a protective coating for an optical fiber especially suited for protection against an intermittent incident laser beam.

It is also an object of the present invention to provide an improved coated optical fiber construction for streaming deployment from missiles and the like for use in environments where sweeping laser beams may be encountered.

SUMMARY OF THE INVENTION

In accordance with the aforesaid objects and as embodied and broadly described herein, the apparatus for protecting an optical fiber from an incident laser beam comprises protective coating means surrounding the optical fiber, wherein the protective coating means includes a layer of intumescent material selected to foam at the heat input levels of the incident laser beam and to insulate the surrounded optical fiber against heat damage. Preferably, the protective coating means includes at least one further layer of optically reflective material cooperating with the intumescent layer.

Further in accordance with the present invention, as embodied and broadly described herein, the improved coated optical fiber for use in an environment exposed to an intermittent laser beam, the coated optical fiber of the type having an optically permeable fiber core and a surrounding coating layer, comprises the coating layer being formed from an intumescent material selected to foam at the heat input levels of the incident laser beam and to insulate the optical fiber against heat damage; and protective layer means surrounding the coating layer. The protective layer means includes at least one layer formed from a reflective material. Preferably, the reflective material is selected from the group consisting of aluminum, gold and platinum, and the intumescent material is fire retardant latex ("FRL") such as that manufactured and sold by ALBI.

The invention resides in the novel parts, constructions, steps, arrangements, combinations and improvements shown and described. The accompanying drawings, which are incorporated in and constitute a part of this specification, illustrate the presently preferred embodiments of the invention, and, together with the description, serve to explain the principles of the invention.

DESCRIPTION OF THE PREFERRED EMBODIMENT

Reference will now be made to the present preferred embodiment of the invention, examples of which are illustrated in the accompanying drawings.

Figure 2A:
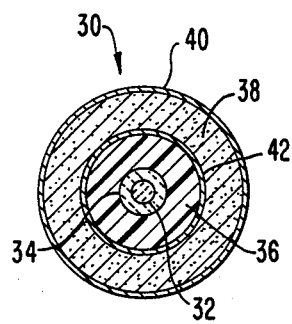
FIGS. 2A and 2B are schematic sectional views of coated optical fibers made in accordance with the present invention.
Figure 2B:
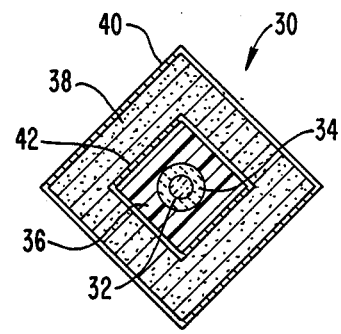

With initial reference to FIGS. 2A and 2B, there are shown optical fibers made in accordance with the present invention and designated generally by the numeral 30. Each includes a central core 32 and a surrounding layer 34. Generally, core 32 and layer 34 are glass-type materials, and layer 34 is formed from a glass material having a lower refractive index than the glass material of core 32. Disposed to cover layer 34 is a coating or "jacket" 36 which can be a synthetic plastic material such as silicon acrolate. Although it is convenient to form core 32, layer 34, and coating 36 in circular cross-sections, other geometric shapes may be employed. FIG. 2B shows coating 36 formed in a rectangular configuration over circular core 32 and circular layer 34, to lessen the possibility of "slump" when wound on a bobbin (not shown). A method of manufacturing the non-circular coating is set forth in my co-pending application Ser. No. 07/206281,filed June 14, 1988.

As summarized above, the apparatus for protecting an optical fiber from an incident laser beam specifically includes a protective coating means surrounding the optical fiber, wherein the protective coating means includes a layer of intumescent material. As embodied herein, and with continued reference to FIGS. 2A and 2B, the coating means includes layer 38 of an intumescent material selected to foam or otherwise react at the heat input levels of the potentially damaging incident laser beam and to insulate the surrounded optical fiber against heat damage. As used herein, intumescent materials are materials which have the property that the material is initially flexible and foams or react to create an insulating layer as it is heated. These materials can expand greatly in volume and provide a direct insulation layer to protect coating 36, covering layer 34 and optical fiber core 32. Although a variety of intumescent materials have been found to be useful, ALBI-FRL is currently preferred for the intumescent material for layer 38.

Although the layer of intumescent material is adequate against current threats, reflective coatings may be used in conjunction with the intumescent layer to increase the protection to the coated optic fiber elements 32, 34 and 36. Hence, the protective coating means preferably includes one or more layers of an optically reflective material. Generally, reflective materials suitable for the expected incident radiation wavelength should be used. The most likely wavelength of the incident laser beam will be 10.6 microns which is generated by a $CO_2$ laser. Air is substantially permeable to radiation at this wavelength, and large energy losses are not encountered. A wide variety of reflective materials will yield reflectivities of 90% or more at this wavelength, including aluminum, rhodium, copper, gold, silver and platinum.

As embodied herein, and with reference again to FIGS. 2A and 2B, two separate reflective layers are provided, namely layer 40 positioned to cover intumescent layer 38, and layer 42 positioned between intumescent layer 38 and coating 36. As stated above, a wide variety of reflective materials may be used to protect an optical fiber. Although aluminum is a preferred reflective material in terms of combined performance and cost considerations, other materials such as gold, silver and platinum can provide superior high temperature performance. A reflective layer thickness of 50A° or greater also is currently preferred.

Figure 4:
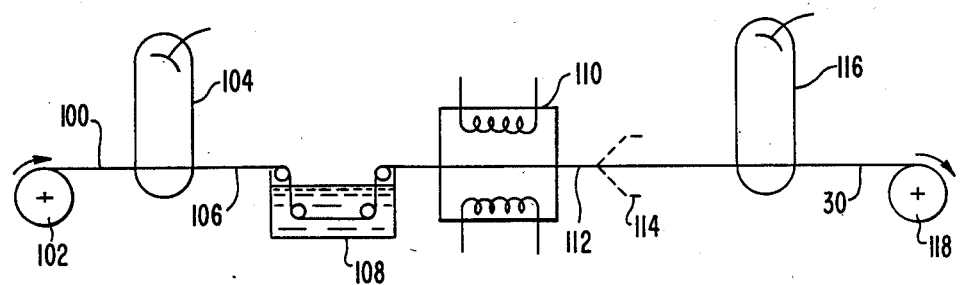
FIG. 4 is a schematic showing a process for the manufacture of the coated optical fiber depicted in FIG. 2A or 2B.

FIG. 4 depicts schematically a continuous process for producing protected coated optical fiber of the type shown in FIGS. 2A and 2B. In FIG. 4, coated optical fiber preform 100 (corresponding to elements 32, 34 and 36 of the construction shown in FIGS. 2A and 2B) is payed off from spool 102 and enters a reflective material application device, such as vacuum dome 104, where a reflective layer corresponding to layer 42 is applied by sputtering or vacuum deposition, to yield intermediate product 106. Product 106 is then fed through one or more dip tanks 108 containing intumescent material such as FRL in liquid or slurry form. One or more dryers 110 solidify the adhered film of intumescent material which typically is about 8 mils thick to yield a further intermediate product 112 having a dried, 4 mil thick intumescent layer corresponding to layer 38 in FIGS. 2A and 2B. Thereafter, product 112 optionally can be fed through a sizing die such as die 114 to correct the diameter and/or conform the outer periphery to a desired shape (which can be non-circular —see FIG. 2B), and then fed to another reflective material application device. In FIG. 4, vacuum dome 116 is used to apply a reflective layer corresponding to layer 40 in FIGS. 2A and 2B to yield the finished protected coated optical fiber product 30 which can be re-spooled on spool 118. Other processes or variations of the process shown in FIG. 4 can, of course, be used, as one skilled in the art would realize given the present disclosure.

Figure 1:
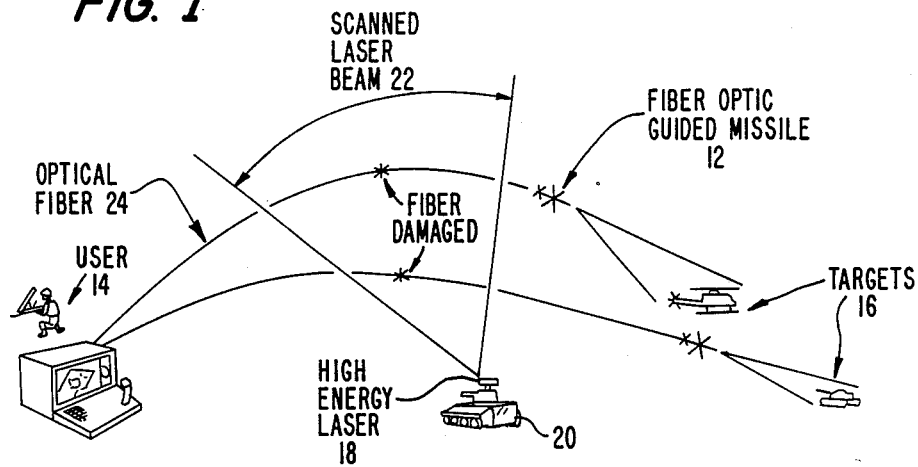
FIG. 1 is a schematic representation of an application particularly suited for the present invention.

In operation, when the laser resistant optical fiber 30 of FIGS. 2A or 2B is intercepted by a scanning laser beam, beam 22 in FIG. 1, the laser energy is partially reflected by the outside reflective layer 40. At high laser energy levels and/or prolonged exposure times, reflective layer 40 will be rapidly destroyed; however, any reduction in the energy incident on laser 34 and core 32 reduces the damage potential of the laser beam. The action of the transmitted laser energy causes intumescent layer 38 to change phase, swell and char. This action provides a thermal barrier between the laser beam and the inner layers. Second reflector layer coating 42 may be used to reflect away part of the radiant energy from passing into coating 36. Acrolate coating 36 provides a final barrier to the laser beam. Typical acrolate coatings are, however, a low level protection thermoplastic.

Figure 3:
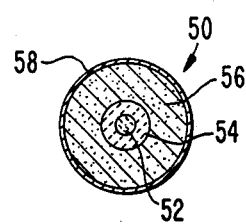
FIG. 3 is a schematic sectional view of an improved coated optical fiber made in accordance with the present invention.

Although at the current time materials such as silicon acrolate are in vogue for use as a protective coating on optical fibers to be used in communications, more rugged and environment-tolerant materials can be used in a fiber intended for military applications. Therefore, and further in accordance with the present invention, an improved coated optical fiber can be constructed if intumescent coatings with acceptable flexibility are used to replace the silicon acrolate coatings, without causing a major change in fiber characteristics. These coatings, especially if combined with one or more reflective coatings, will provide significant laser beam protection. As embodied herein, and with reference to FIG. 3, optical fiber 50 includes optical core 52 and optical layer 54, corresponding to core 32 and layer 34 in the FIG. 2A and 2B embodiments, but with coating 56 being formed from an intumescent material. Further, outer layer 58 in the FIG. 3 embodiment is formed from a reflective material, such as aluminum, gold, silver, copper, rhodium or platinum, by vapor deposition or sputtering.

It would be apparent to those skilled in the art that various modifications and variations could be made to the disclosed optical fiber products of the present invention, without departing from the scope or spirit of the invention.

What is claimed is:

1. Apparatus for protecting an optical fiber from an incident laser beam comprising:
   protective coating means surrounding the optical fiber, wherein said protective coating means includes a layer of intumescent material selected to react at the heat input levels of the incident laser beam and to insulate the surrounded optical fiber against heat damage.

2. The apparatus as in claim 1 wherein said protective coating means includes at least one further layer of optically reflective material cooperating with said intumescent layer.

3. Apparatus for protecting a coated optical fiber from an incident laser beam comprising:
   a first protective layer surrounding the coated fiber, said first protective layer comprising a material having the property of intumescence whereby the material foams at heat input levels of the incident laser beam and insulates the coated optical fibers against heat damage; and
   a second protective layer surrounding said first layer and formed from an optically reflective material.

4. The apparatus as in claim 3, wherein said intumescent material is fire retardant latex.

5. The apparatus as in claim 3, wherein said reflective material is selected from the group consisting of aluminum, gold, silver, copper, rhodium and platinum.

6. The apparatus as in claim 3, wherein said second protective layer is greater than about 50A° in thickness.

7. The apparatus as in claim 3, further including a third protective layer formed of a reflective material, and positioned between said first layer and the optical fiber.

8. The apparatus as in claim 7, wherein said third layer reflective material is selected from the group consisting of aluminum, gold, silver, copper, rhodium and platinum.

9. Improved coated optical fiber for use in an environment exposed to an incident laser beam, the coated optical fiber of the type having an optically permeable fiber core and a contacting, surrounding coating layer, the improvement comprising:

(a) the coating layer being formed from an intumescent material selected to foam at the heat input levels of the incident laser beam and to insulate the optical fiber against heat damage; and (b) protective layer means surrounding the coating layer.

10. The improved coated optical fiber as in claim 9, wherein said protective layer means includes at least one layer formed from a reflective material.

11. The improved coated optical fiber as in claim 9, wherein said protective layer means includes at least one layer formed from an intumescent material.

12. The improved coated optical fiber as in claim 11, including at least one layer formed from a reflective material.

13. The improved coated optical fiber as in claim 12, wherein said one reflective material layer is between said instrument material coating and said intumescent material layer.

14. The improved coated optical fibers as in claim 12, wherein said one reflective material layer is positioned radially outermost to surround both said intumescent material coating and said intumescent material layer.

15. The improved coated optical fiber as in claim 14, wherein said protective layer further includes a second reflective material layer positioned between said intumescent material coating and said intumescent material layer.

16. Method for protecting an optical fiber against an incident laser beam, the method comprising the steps of:
   forming a first layer of optically reflective material surrounding the optical fiber;
   forming a layer of intumescent material covering the optical fiber; and
   forming a second layer of optically reflective material surrounding said intumescent material.

* * * * *

UNITED STATES PATENT AND TRADEMARK OFFICE
CERTIFICATE OF CORRECTION

PATENT NO. : 4,889,400

DATED : December 26, 1989

INVENTOR(S) : GEORGE T. PINSON

It is certified that error appears in the above-identified patent and that said Letters Patent is hereby corrected as shown below:

IN THE ABSTRACT:

Line 2, "mroe" should be --more--

Signed and Sealed this

Twenty-ninth Day of January, 1991

Attest:

HARRY F. MANBECK, JR.

Attesting Officer

Commissioner of Patents and Trademarks